Aug. 8, 1967 H. K. BROSS 3,334,615
WRITING INSTRUMENT
Filed Oct. 10, 1963 6 Sheets-Sheet 1
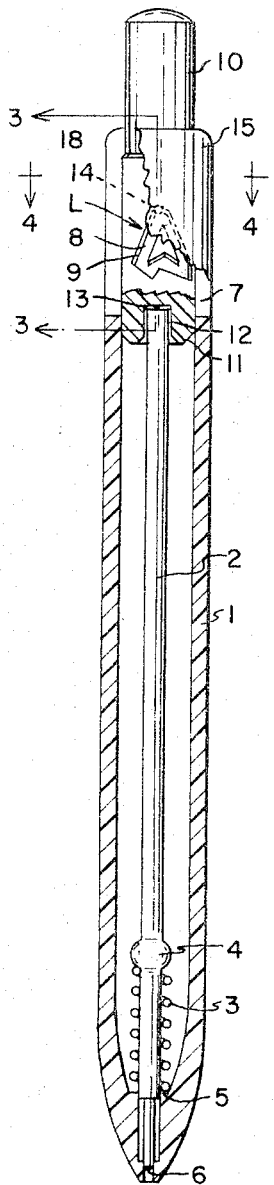
FIG. 1
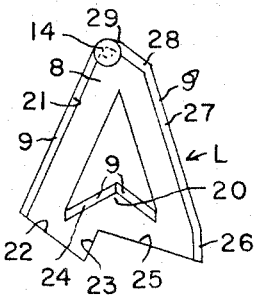
FIG. 2
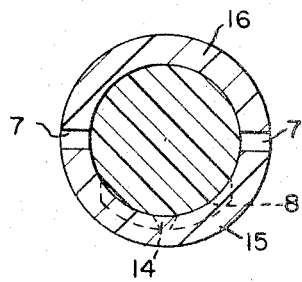
FIG. 3
FIG. 5
FIG. 4
INVENTOR
HELMUT KARL BROSS
BY Frank T. Johmann

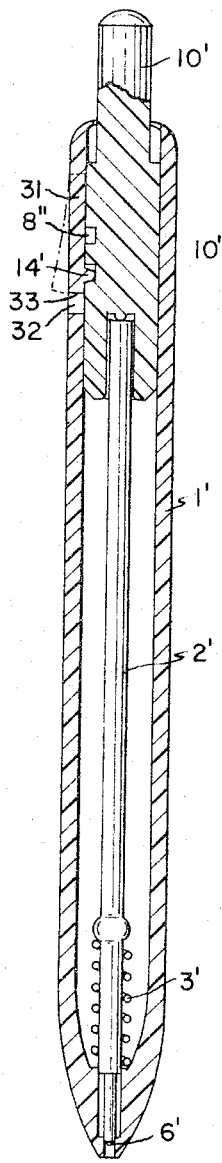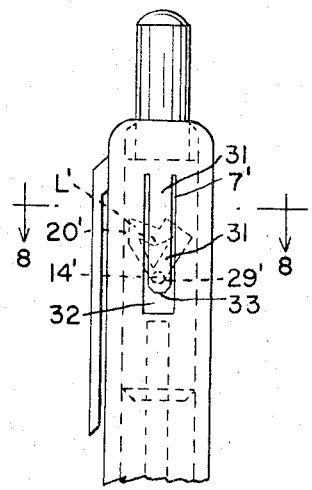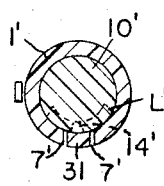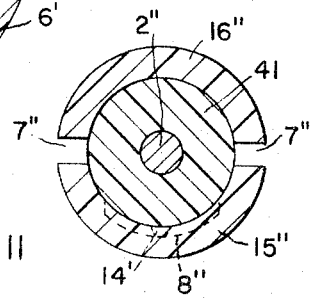

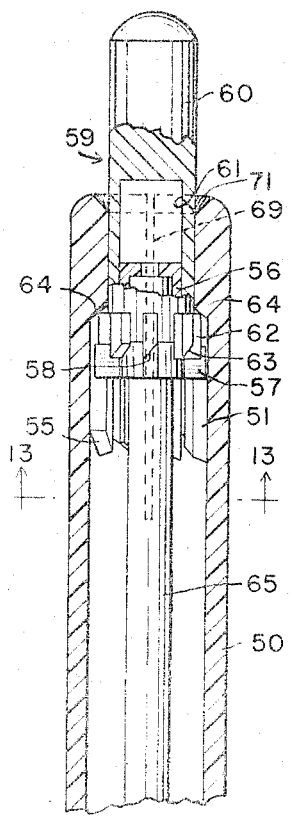
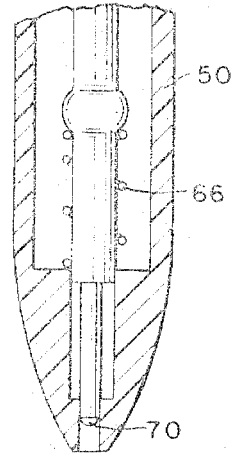
FIG. 12
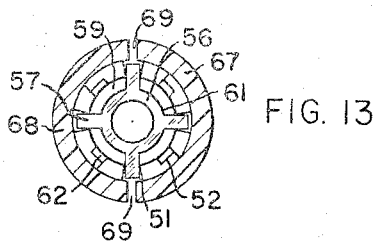
FIG. 13
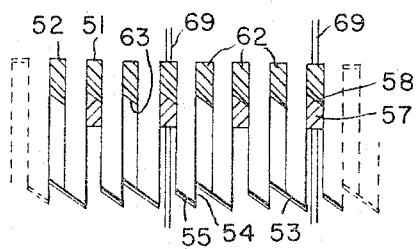
FIG. 14
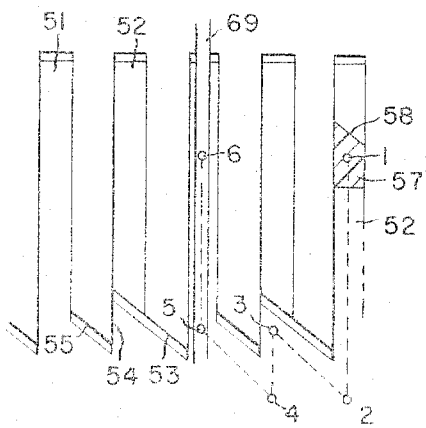
FIG. 15
INVENTOR
HELMUT KARL BROSS Aug. 8, 1967 H. K. BROSS 3,334,615
WRITING INSTRUMENT
Filed Oct. 10, 1963 6 Sheets-Sheet 4
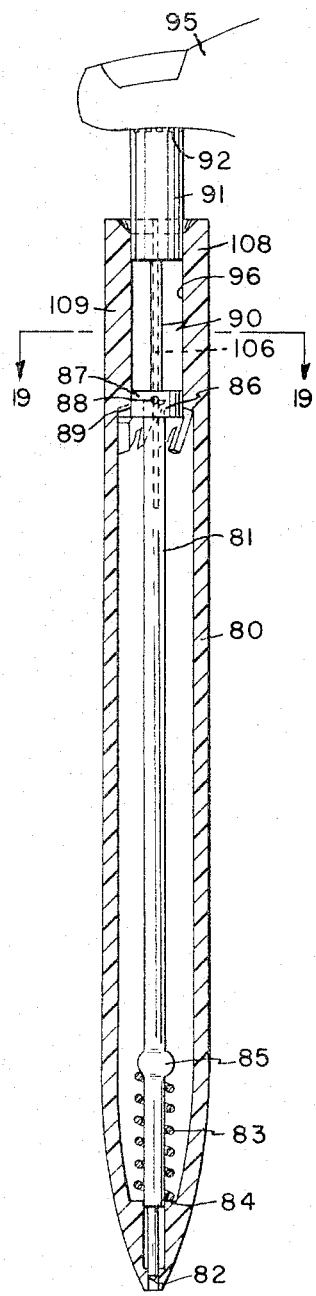
FIG. 16
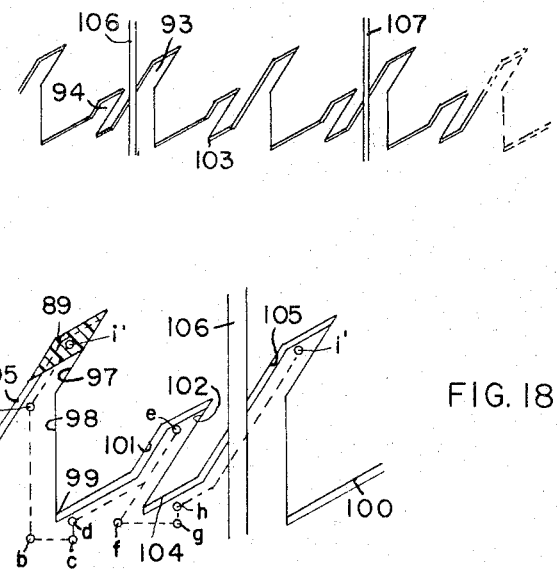
FIG. 17
FIG. 18
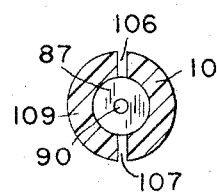
FIG. 19
INVENTOR
HELMUT KARL BROSS
BY Frank T. Johmann Aug. 8, 1967  H. K. BROSS  3,334,615
WRITING INSTRUMENT
Filed Oct. 10, 1963  6 Sheets-Sheet 5

INVENTOR
HELMUT KARL BROSS
BY Frank T. Johmann

Aug. 8, 1967   H. K. BROSS   3,334,615
WRITING INSTRUMENT
Filed Oct. 10, 1963   6 Sheets-Sheet 6
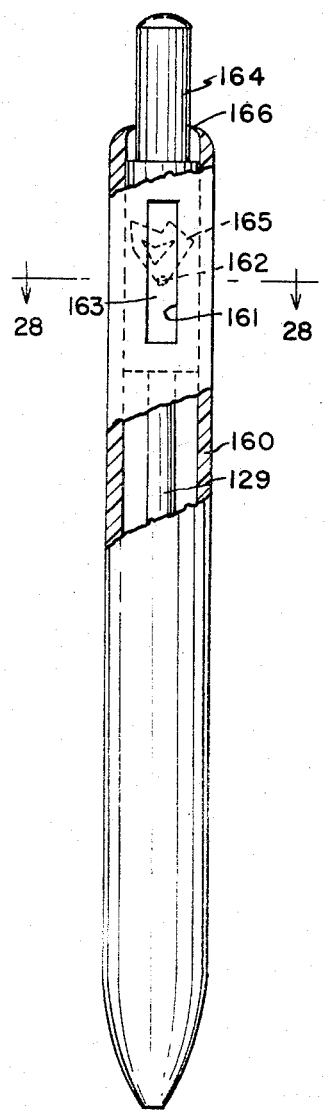
FIG. 27
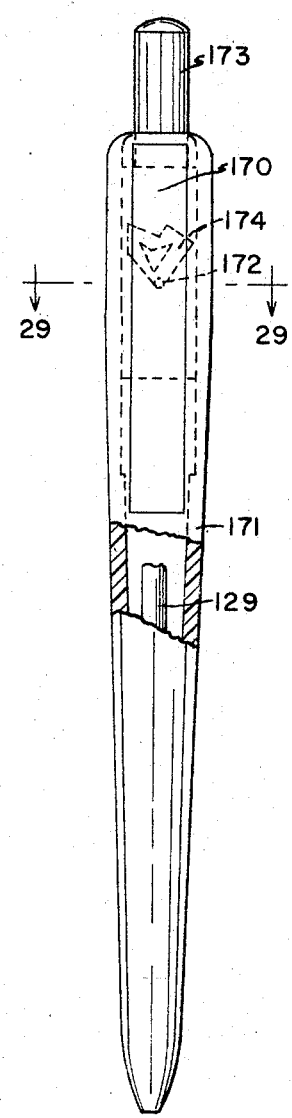
FIG. 29
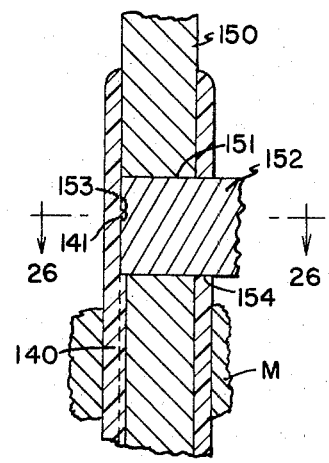
FIG. 25
FIG. 26
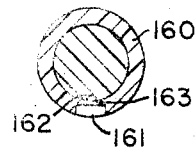
FIG. 28
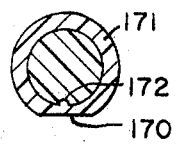
FIG. 30
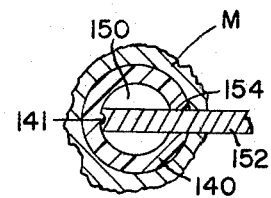
INVENTOR
HELMUT KARL BROSS
BY Frank T. Johmann

# United States Patent Office 3,334,615
Patented Aug. 8, 1967

3,334,615
WRITING INSTRUMENT
Helmut Karl Bross, Altenberg uber Nurnberg, Germany, assignor of thirty-three and one-third percent to Frank T. Johmann, Berkeley Heights, N.J.
Filed Oct. 10, 1963, Ser. No. 315,275
Claims priority, application Germany, Oct. 20, 1962, B 69,326; Oct. 29, 1962, B 69,409; Nov. 20, 1962, B 69,688
7 Claims. (Cl. 120—42.03)

This invention relates to writing instruments, particularly retractable ballpoint pens.

The present invention permits the construction of ballpoint pens having a minimum of parts, which are easily and quickly assembled, which pens are operable to retract and project the writing point by a depression and release of an actuating member. The retraction mechanism of my invention may be one of a number of mechanisms, including ratchet or cam type mechanisms wherein a latch is directed by ratchet action to either a retracted or a projected position in the latch receiver. An important feature of the present invention involves molding either the latch receiver, or the latch, as an integral part of the plastic pen barrel. The pen barrel is preferably a single molded piece, and it can have slots or slits proximate the integrally molded latch or latch receiver to permit ready-stripping of the molded part from the core pen of the mold. Another feature of my invention involves assembly of the pen by simple insertion through the actuating end of the barrel. Various other features and aspects of the invention will become apparent from the following description and drawings wherein:

FIGURE 1 is a longitudinal view, partly in cross-section and partly broken away, illustrating a ballpoint pen of the invention having a heart-shaped cam type of retraction mechanism.

FIGURE 2 is a side fragmentary view of the upper portion of the pen of FIGURE 1.

FIGURE 3 is a cross-sectional view taken along the line 3—3 of FIGURE 1 and is on an enlarged scale.

FIGURE 4 is a cross-sectional view taken along the line 4—4 of FIGURE 1.

FIGURE 5 is an enlarged schematic diagram illustrating the various positions of the latch and latch receiver during the retraction-projection cycle.

FIGURE 6 is a longitudinal view, partly in section, illustrating another modification of my invention.

FIGURE 7 is a side fragmentary view of the upper portion of the pen of FIGURE 6.

FIGURE 8 is a cross-sectional view taken along the line 8—8 of FIGURE 7.

FIGURE 9 is a longitudinal front view, partly in section, illustrating my invention applied to a tip-actuated writing instrument.

FIGURE 10 is a fragmentary side view, of the lower portion of the pen of FIGURE 9, when the pen is in a point-concealed position.

FIGURE 11 is a cross-sectional view taken along the line 11—11 of FIGURE 9.

FIGURE 12 is a longitudinal view, partly in section and broken, illustrating my invention applied to a rotary-cross type latching mechanism.

FIGURE 13 is a cross-sectional view taken along the line 13—13 of FIGURE 12.

FIGURE 14 is a developed view of the latch, latch actuator, and latch receiver of the rotary-cross mechanism of FIGURES 12 and 13.

FIGURE 15 is an enlarged, developed view of a portion of the latch receiver of FIGURES 12 to 14, schematically illustrating the various stages of the latch relative to the latch receiver during the retraction and projection cycle.

FIGURE 16 is a longitudinal sectional view of another embodiment of my invention.

FIGURE 17 is an enlarged developed view of the latch receiver of FIGURE 16.

FIGURE 18 is an enlarged developed view of a portion of the latch receiver schematically illustrating the latching sequence.

FIGURE 19 is a cross-sectional view taken along the line 19—19 of FIGURE 16.

FIGURE 25 is a sectional view illustrating the core pen arrangement in molding the pen barrel of the embodiment of FIGURES 23 and 24.

FIGURE 26 is a cross-sectional view taken along the line 26—26 of FIGURE 25.

FIGURE 27 is a longitudinal view of another embodiment of my invention.

FIGURE 28 is a cross-sectional view taken along the lines 28—28 of FIGURE 27.

FIGURE 29 is a longitudinal view of yet another embodiment of my invention.

FIGURE 30 is a cross-sectional view taken along the lines 30—30 of FIGURE 29.

Figure 20:
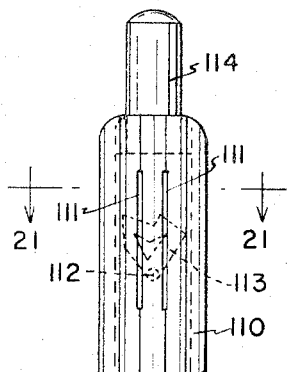
FIGURE 20 is a side view of a modification of the upper portion of the pen of FIGURES 6 to 8.

Reference is now made to the embodiment of FIGURES 1 to 5 in detail. Here, the pen comprises a one-piece barrel carrying the writing cartridge 2 which is urged upwardly by means of the retraction spring 3 bearing against the cartridge flange 4 and the annular interior barrel lip 5, thereby urging the writing point 6 to a retracted position wherein it is concealed within barrel 1. The upper portion of barrel 1 is divided into sides 15 and 16 by two diametrically opposed slots 7 extending downwardly from the upper end of the barrel. Molded within barrel 1, between slots 7, is groove 8 defining a heart-shaped cam latch receiver L. Groove 8 has tapered sides 9 along the upper edges of the groove to permit stripping the barrel 1 off of a core pin (not shown) when using conventional injection molding techniques in forming the pen barrel 1. The actuating member or pushbutton 10 is formed with the annular beveled edge 11, the blind bore 12 for receiving the upper end of ballpoint cartridge 2, and the spacing ribs 13 which seat the upper end of cartridge 2 so as to act as an air vent to permit the ingress of air into the cartridge 2. Projecting radially outwardly from the side of cylindrical pushbutton 10 is the latch 14, preferably having tapered sides so as to be in the form of a truncated cone. This pen then consists of only four pieces to be assembled, namely the ballpoint cartridge unit 2, the retraction spring 3, the barrel 1, and the pushbutton 10. The pen is assembled by dropping the retraction spring 3 and cartridge 2 into barrel 1, and then pressing the pushbutton 10 into the upper end of the casing 1 (the annular beveled edge 11 facilitates entry of pushbutton 10 into barrel 1), thereby spreading the upper barrel sides 15 and 16 away from each other (as shown in dashed lines in FIGURE 2) until the latch 14 seats within the heart-shaped groove 8. At this point, due to the natural resiliency of the plastic pen barrel 1, casing sides 15 and 16 will resume their normal positions as shown in full lines of FIGURES 2 and 3 so that the pen is held assembled together. To replace the cartridge 2, the pen can be disassembled by pulling sides 15 and 16 away from each other, for example by inserting finger nails into slot 7, or prying with a coin. When this happens, latch 14 will slide out of its position in groove 8 and along the inner barrel side 17 under the expansive force of the coil retraction spring 3. To prevent retraction spring 3 from suddenly shooting the cartridge 2 and pushbutton 10 completely out of the barrel, the casing 1 can be formed with a thickened annular wall portion 18 at its upper end defining the annular shoulder 19. Thus, member 14 sliding along wall 17 during disassembly will be stopped at shoulder 19. Once stopped at shoulder 19, then pushbutton 10 can be readily pulled from barrel 1 so that the pen can be completely disassembled to permit the insertion of a fresh cartridge 2. Reassembly, of course, is readily accomplished as previously described.

The operation and description of heart-shaped cams is well known in the art and has been described in U.S. Patents 2,671,354 and 2,972,980. In brief, as pushbutton 10 is depressed and released, the latch 14 will be directed from its point-retracted position of FIGURE 1 to its point-projected position within the notch 20 by engagement with walls 21, 22, 23, and 24. A subsequent depression and release of the pushbutton 10 will cause latch 14 to move from position 20 into contact with wall 25, then wall 26 and finally along walls 27 and 28 to its original point-retracted position within notch 29. It will be apparent that when latch 14 is in notch 29, ballpoint 6 is retracted for carrying as in FIGURE 1. When projection 14 is within the notch 20, then the point 6 will be projected outside the barrel in a point-projected position for writing.

It is thus seen that the embodiment of FIGURES 1 to 5 provides a simple, inexpensive pen using a minimum of parts and is very quickly and easily assembled. In addition, for further economy, the clip 30 can also be molded integrally with barrel 1.

Another modification of my invention is shown by FIGURES 6 to 8, wherein the heart-shaped latch receiver L' is molded integrally as part of the pushbutton 10', while the latch 14' is molded as part of the casing 1'. More specifically, the casing 1' has the U-shaped slot 7' defining the leaf spring 31 which is interiorly formed with the inwardly projecting frusto-conical latch 14'. The retraction and projection operation, upon depression and release of pushbutton 10', of latching unit L'-14', is similar to that of the embodiment of FIGURES 1 to 5, with the exception that instead of latch 14 moving relative to the stationary latch receiver L as in the embodiment of FIGURES 1 to 5, the latch receiver L' moves relative to the stationary latch 14', and in addition the position of the latch receiver L' is upsidedown from the latch L of FIGURES 1 to 5. When latch 14' is in notch 20', the point 6' is projected. When latch 14' is in notch 29', point 6' is retracted. The pen can be readily disconnected by inserting a fingernail in the void 32 under the lower end 33 of the resilient leaf spring 31 and then lifting outwardly to move latch 14' transversely out of the groove 8' as shown by dashed lines in FIGURE 6. On this occurring, retraction spring 3' will urge the cartridge 2' and pushbutton 10' outwardly through the top of the casing 1', permitting removal of cartridge 2'. Reassembly, or initial assembly, of the instrument is readily accomplished by inserting the retraction spring 3', the cartridge 2', and the pushbutton 10' into the barrel 1' until the latch 14' snaps into the groove 8'. FIGURES 9 to 11 illustrate a form of my invention applied to a tip-actuated writing instrument. Specifically, the barrel 1" has the upper end 40, while its lower end is split and defines the two diametrically opposed slots 7". The barrel 1" defines the heart-shaped cam groove L", while the tubular hood, or actuating member 41 defines the radially outwardly projecting latch 14". The upper inner portion of the barrel 1" defines four inwardly projecting ribs 42, which serve as a guide for the ballpoint cartridge unit 2" and also to center the relatively strong coil compression spring 43. A weaker coil compression spring 44 is disposed between the cartridge flange 4" and the top of hood 41. When the point 6" is extended (actually the hood 41 is retracted) as in FIGURE 9, opposing springs 43 and 44 are in balance and the stronger spring 43 resists the normal writing force to keep the point 6" projected. To conceal the writing point 6", the point 6" is pressed firmly downwardly against a rigid surface 45, for example the writing surface, to force the cartridge 2" inwardly relative to barrel 1" and against the pressure of coil spring 43. As this inward movement occurs, the hood 41 will also be moved inwardly relative to barrel 1" and will circumferentially shift as its latch 14" follows along groove 8". Upon lifting the instrument from contact with rigid surface 45, the hood 41 will now move outwardly relative to barrel 1" and its latch 14" will drop down to engagement within the notch 29" so that the hood 41 is held further extended relative to the barrel 1" than before. At the same time, a new balance is reached between opposing springs 43 and 44. This new balance results in dropping cartridge 2" slightly further downwardly relative to the barrel 1", as compared to FIGURE 9, but still less than the distance that hood 41 has dropped, so that the lower end of the pen assumes the position shown in FIGURE 10. Upon a subsequent pressing of the lower end of the instrument, that is the extended hood 41 and the point 6", into contact against the rigid writing surface 45, followed by release from said contact, the hood 41" and cartridge 2" are shifted back into the point extended position of FIGURE 9. Hood retractable tip-actuated pens are known and a detailed explanation of the operation of a hood retractable tip-actuated pen is given in English Patent 915,522.

The tip-actuated pen of FIGURES 9 to 11 is assembled by holding barrel 1" upside down, then dropping the strong coil spring 43, the cartridge 2", and the weak coil spring 44 into place, and finally forcing the hood 41 into the end of the pen so as to spread apart the sides 15" and 16" divided by slots 7" (as shown by dotted lines in FIGURE 10) until the latch 14" slips into the cam groove 8", whereupon the sides 15" and 16" will assume their normal shape thereby firmly engaging the heart-shaped groove 8" around latch 14". Disassembly, of course, is accomplished by spreading the sides 15" and 16" so that the hood 41 may be pulled out through the lower end of the pen barrel 1".

In the embodiment of FIGURES 12 to 15, the one-piece pen barrel 50 has molded within its upper portion a latch receiver including a series of circumferentially spaced, longitudinally extending grooves or slots of varying cross-sections. Specifically, this portion of the barrel defines the deep, longitudinal extending grooves or recesses 51 having a large cross-section and the shallow longitudinal extending grooves or recesses 52 having a smaller cross-section. Between adjacent grooves, are switching or ratchet teeth including the tooth sides 53, 54, and 55. The latch, or rotary-cross per se, include the tubular shaft 56 terminating at its lower end in four equally circumferentially spaced, outwardly extending latch teeth or ears 57, whose upper ends are beveled at 58. The latch actuator 59 includes cylindrical pushbutton 60 extending through the top end of barrel 50, the tubular bore 61, and eight equally circumferentially spaced, outwardly extending actuating teeth or ears 62, whose lower edges are beveled at 63. As shown in FIGURE 14, the ears 62 extend into both slots 51 and 52. The upward movement of actuator 59 under bias of retraction spring 66, relative to barrel 50 is limited by engagement of its ears 62 with the inner annular barrel shoulder 64. Latch 56 abuts the upper end of cartridge 65 due to retraction spring 66 urging cartridge 65 upwardly.

The pen is assembled by pushing cartridge 65, retraction spring 66, latch 56 and actuator 59 into the upper end of barrel 50, which upper barrel portions 67 and 68, divided by slots 69 will spread apart to permit entry of latch 56 and actuator 59 through the upper end of barrel 50. However, once the ears 57 and 62 of said latch and actuator, respectively, are past annular shoulder 64, the barrel portions 67 and 68 will resume their normal shape as shown in FIGURES 12 and 13, to hold the assembled pen together.

Operation of the rotary-cross pen mechanism illustrated by FIGURES 12 to 15 is well known in the art. Such mechanisms and their operation have been described in French Patent 1,156,612 and English Patent 748,897.

The operation is illustrated diagrammatically in FIGURE 15. Here, a portion of the latch receiver formed within the barrel 50 has been enlarged and developed into a single plane. The small numbered circles represent the positions of the center of a latch ear 57 at various stages of the projection-retraction cycle. Initially, when the ballpoint 70 is retracted, ear 57 is at position 1, in the deep slot 52. When the pushbutton 60 is pressed downwardly by thumb pressure against the pressure of spring 66, latch ear 57 moves downwardly to position 2, where it slides off the abutting actuator ear 62 onto tooth sides 53 while said latch ear 57 is slightly rotated. As the actuating pushbutton 60 moves upwardly under urging of spring 66 upon release of said thumb pressure, the ear 62 moves upwardly by sliding along tooth side 53 until it comes into engagement with the vertical side 54, i.e., position 3, which is the point-projected position of the pen, i.e., point 70 will now be projected for writing. As the retraction cycle is begun, pushbutton 60 is depressed again against the pressure of spring 66, and latch ear 57 is moved downwardly to position 4 by an abutting actuating ear 62. Latch ear 57 then moves to position 5 after it slides off abutting ear 62, and finally moves to position 6 as the actuating pushbutton 60 moves upwardly upon the release of thumb pressure under the bias of spring 66. In position 6, ear 57 is again in a retracted position and ready for the start of another cycle. During the projection-retraction cycle just described, ear 57 has been rotated through a 90° arc.

To aid assembly of the pen, the upper end of barrel 50 defines the annular conical bevel 71 to facilitate insertion of the latch teeth 57 and latch actuator 59 into the barrel 50 during assembly. Also to facilitate removal of the barrel 50 from its core pin (not shown) when it is formed by injection molding, the edges of latch receiver tooth sides 55 and 53 are beveled as is also the annular shoulder 64.

In the embodiment of FIGURES 16 to 19, the pen includes the tubular slightly resilient plastic barrel 80, the ballpoint cartridge unit 81, including ballpoint 82, normally urged upwardly towards a point-retracted position by retraction coil compression spring 83 bearing against annular lip 84 of the barrel and flange portion 85 of cartridge 81. The upper end of cartridge unit 81 extends into the blind bore 86 of tubular switch member 87. Member 87 defines the transverse bore, or air vent, 88 which permits the ingress of air into cartridge 81 as ink is used out of said cartridge. Extending outwardly from 87 is the latch ear 89 having a parallelogram cross-section. Extending upwardly from member 87, and integral therewith, is the slender cylindrical shaft 90 which terminates at its upper end in the cylindrical pushbutton 91. The upper end of pushbutton 91 defines a series of ridges 92. The elements defined by numbers 86 to 92 constitute a single integral, one piece, plastic pushbutton unit, wherein said unit is preferably molded of a plastic such as polypropylene or high density polyethylene, which is slightly resilient and elastic. In this way, the relatively long, slender shaft 90 will flex or twist, while the remaining thicker portions of said pushbuttons unit will be relatively stiff and rigid. Molded integrally with the upper part of barrel member 80 is the latch receiver including a series of deep longitudinally extending helical grooves or recesses 93 alternating with a series of shallow longitudinal extending helical grooves for recesses 94.

The operation of the pen will now be described with particular reference to FIGURE 18. For added clarity, the position of the midpoint of latch 89 relative to the latch receiver, at various stages of projection-retraction operation, is indicated by lettered, small circles in FIGURE 18.

To operate, a thumb or finger 95 is pressed downwardly against the ridged upper end 92 of pushbutton 91. This forces pushbutton 91, shaft 90, member 87, ear 89, and cartridge 81, downwardly relative to casing 80 against the bias of coil compression spring 83, as cylindrical pushbutton 91 moves downwardly in the tubular bore 96. As this downward movement occurs, the ear 89 is initially partly rotated, i.e. circumferentially shifted, in a counterclockwise direction (when viewed from the top of FIGURE 16) as said ear 89 moves along the groove wall 97 to position $a$ of FIGURE 18. This partial rotation of ear is permitted by the twisting of shaft 90 which acts as a torsion spring. On the other hand, pushbutton 91 does not rotate due to its frictional engagement with thumb 95. Thus, ear 89 partly rotates relative to both the latch receiver and pushbutton 91 while energy is stored by the partial twisting of the spring-like torsion shaft 90. Upon further depression of pushbutton 91, ear 89 moves directly downwardly while engaging vertical wall 98 until said ear 89 passes the edge 99 (position $b$), whereupon ear 89 snaps, i.e. partly rotates, to position $c$ due to the untwisting spring action of torsion shaft 90. The user then removes his thumb 95 from pushbutton end 92. The coil spring 83 will now begin to expand to move cartridge 81 and its abutting member 87 upwardly. As this upward movement occurs, ear 89 will move from position $c$ to position $d$ and will then slide along wall 100, and then wall 101, into shallow groove 94 (position $e$) which defines the projected position of the pen. At this point, member 87 is locked lower within the casing 80 than before, with the result that the abutting cartridge 81 will be in a projecting position where its writing ball 82 extends through the lower end of barrel 80. As latch ear 89 slides from position $d$ to position $e$, it of course partly rotated relative to the latch receiver. However, this time all of the pushbutton unit, i.e. elements 86 to 92 will partly rotate along with ear 89, since there is no frictional engagement with thumb 95 to prevent such partial rotation as was previously present when ear 89 moved from position $i$ to position $a$.

To retract ballpoint 82, the pushbutton 91 is again depressed while in frictional engagement with thumb 95, against the pressure of spring 83. This will cause ear 89 to move downwardly while it is rotated counter-clockwise by sliding engagement against wall 102 until said ear 89 passes point 103 (position $f$) whereupon it will snap to position $g$ due to the torsional action of shaft 90. Upon release of pushbutton 91 by thumb 95, the pushbutton unit will again be moved upwardly within its barrel 80 by spring 83. As said pushbutton unit moves upwardly, ear 89 will move into engagement with wall 104 (position $h$), along which it will slide, following which it will slide down wall 105 into position $i'$ into a deep groove 93, whereupon the abutting cartridge 81 will again be in the point-retracted position of FIGURE 16.

To permit assembly of the pen, the barrel 80 defines the slots 106 and 107 which extend longitudinally downwardly from the upper end of the barrel to a point below the helical grooves 93 and 94. Slots 106 and 107 permit the upper barrel portions 108 and 109 to be sprung apart, in a manner similar to that shown in FIGURE 2, to permit the insertion of the pushbutton unit into the barrel. Then resilient portions 108 and 109 are allowed to return to their normal positions to hold the pen assembled together as shown in FIGURE 16.

Figure 21:
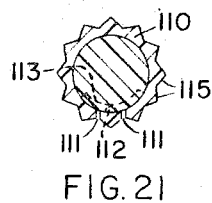
FIGURE 21 is a cross-sectional view taken along the line 21—21 of FIGURE 20.

FIGURES 20 and 21 represent a modification of the embodiment of FIGURE 6 to 8 wherein the pen casing 110 has the pair of longitudinally extending slots 111 on either side of the latch 112 projecting inwardly into the heart-shaped groove 113 defined on the pushbutton member 114. To aid the appearance of the resilient plastic barrel 110, its upper outer circumference can be formed with a series of longitudinally extending ripples 115 which tend to conceal the slots 111. Here, of course, latch 112 moves outwardly by bulging out that portion of the pen barrel between slots 111 to permit withdrawal of the core pen (not shown) from the barrel 110 during injection molding of said barrel and also to permit assembly and disassembly of the barrel 110 with the actuating pushbutton 114 containing the heart-shaped groove 113 around its periphery.

Figure 22:
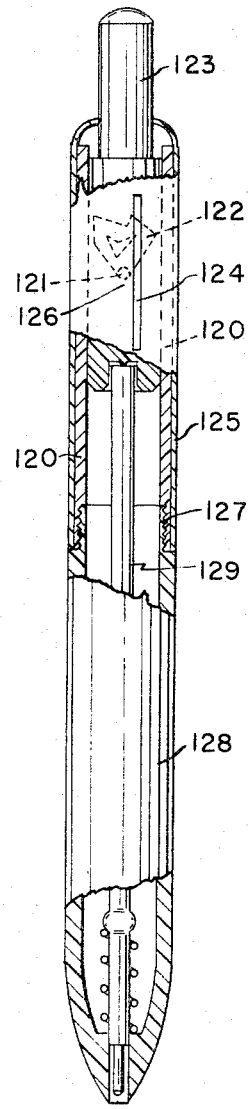
FIGURE 22 is a longitudinal view partly broken and in section illustrating another modification of the pen of FIGURES 6 to 8.

FIGURE 22 represents a modification wherein the upper inner plastic pen casing member 120 defines the inwardly projecting latch 121 which projects into engagement with the heart-shaped groove 122 defined on the circumference of pushbutton 123. The slot 124 extends through the wall of casing member 120 and permits outward movement of the latch 121 to thereby permit assembly and disassembly with the actuating unit 122–123, as well as permitting stripping from the core pin during molding of said member 120. After the actuating unit 122–123 is pressed into the member 120 so that the latch 121 seats within the heart-shaped groove 122, a rigid metal decorative shell 125 can be slipped over the assembly, thus effectively locking latch 121 within said groove 122 since the casing portion 126 can no longer flex outwardly to permit transverse movement of latch 121. The lower inner portion of tubular plastic member 120 can be threaded at 127 into engagement with the lower tubular barrel member 128. In this way, the ballpoint cartridge 129 can be replaced by unscrewing the lower barrel portion.

Figure 23:
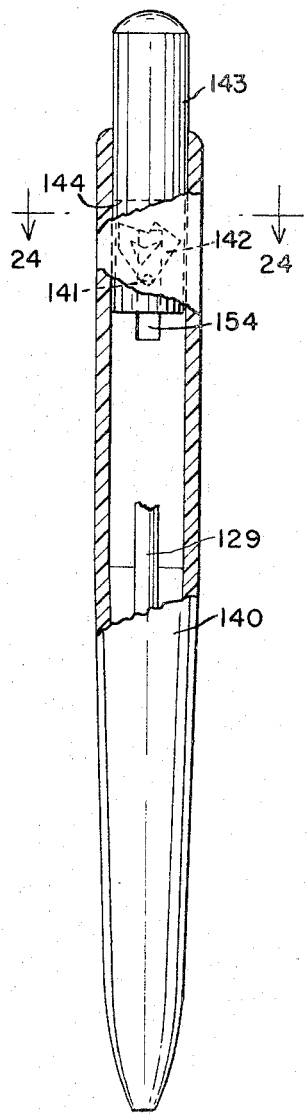
FIGURE 23 is a longitudinal view illustrating yet another modification of the pen of FIGURES 6 to 8.
Figure 24:
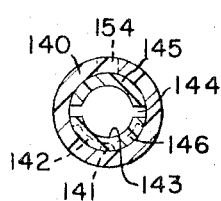
FIGURE 24 is a cross-sectional view taken along the line 24—24 of FIGURE 23.

FIGURES 23 and 24 represent an embodiment having the one-piece casing 140 formed with the inwardly projecting latch 141 for engagement with the heart-shaped cam groove 142 defined on the pushbutton member 143. Here the casing 140 can be rigid while the lower portion of the pushbutton 143 is divided by the slot 144 so as to permit inward movement of the divided sides 145 and 146 towards each other, so that the heart-shaped cam groove 142 can be depressed away from latch 141 as pushbutton 143 is pushed into the casing 140 until latch 141 seats within the groove 142. Then, due to the natural resiliency of the plastic pushbutton member 143, sides 145 and 146 will spring apart to maintain groove 142 in contact with latch 141.

The method of forming tubular barrel 140 is illustrated by FIGURES 25 and 26. Here, the main core pin 150 of the mole is formed with a transversely extending slot 151 through which a second core pin 152 can pass. In the outer face of core pin 152 is formed a recess 153 which shapes the hemi-spherical latch projection 141. In molding, core pin 150 enters the pen barrel mold cavity formed in mold block M, and once it is in molding position, the second core member 152 enters into core pin 150. The plastic is then injected into the mold to define the pen barrel 140. After the plastic sets, core pin 152 is moved transversely out of core pin 150 and pen barrel 140, after which core 150 with barrel 140 is removed from the mold cavity, following which barrel 140 is stripped from core pin 150. In this type of molding, another slot or aperture 154 is formed in the pen barrel directly opposite from the latch member 141. However, this method permits molding the pen barrel of a rigid material. Although, if the pen barrel is rigid, then the actuating member is preferably resilient, for example pushbutton 143 formed with slot 144 to permit sufficient resiliency to permit insertion into the pen barrel.

In the embodiment represented by FIGURES 27 and 28, the barrel 160 is formed with a recess 161 on the outer circumference of the slightly resilient barrel opposite latch 162 thereby defining the thin slightly flexible wall portion 163. Wall portion 163 flexes outwardly away from the axis of the tubular bore of barrel 160 whereby its integrally molded latch 162 can be moved out of said bore. This permits stripping of barrel 160 from its core pin (not shown) during molding. Also, this permits insertion of cylindrical pushbutton 164 into said barrel bore until latch 162 snaps into the heart-shaped cam groove 165. The narrow wall annular end 166 is very thin so that it can readily stretch to enable withdrawal of the core pin during said stripping, yet will resume its shape as shown to reduce the gap between the barrel 160 and pushbutton 164.

FIGURES 29 and 30 represent an embodiment similar to that of FIGURES 27 and 28, except that the flexible wall portion is defined by a flat plane 170 formed in the outer circumference of pen barrel 171. Plane 170 results in a thin wall portion proximate the latch 172, which permits outward flexing of latch 172 to permit stripping the barrel 171 from its core pin during molding, and subsequent assembly with the pushbutton member 173 defining heart-shaped cam groove 174.

The operation of the latch and heart-shaped cam groove latch receiver of the various embodiments of FIGURES 20 to 30 is similar to that of the embodiment of FIGURES 6 to 8.

It will be apparent from the foregoing that a number of minor variations can be made without departing from the invention, although the illustrated embodiment includes the preferred embodiments of the invention.

In sum, the present invention involves integrally molding a latching element, which can be either the latch or latch receiver, as part of a casing member for a switching device, particularly a ballpoint pen switching device. The latching element communicates with the inner bore of the casing member and either projects into said bore, or is a recess extending away from the axis of said bore. In either case, a latching element is defined by the inner wall of the casing member which will generally be tubular. The casing member can be rigid if the actuating member is flexible. Or the casing member can be flexible to permit outward flexing of the latching element away from the axis of said bore. This will also facilitate stripping the casing member from its core pin during injection molding. At the same time, the casing member and actuating member are sufficiently inflexible so that the latch and latch receiver comprising the latching means do not accidentally disengage due to normal writing pressure. This flexibility can be achieved in a number of ways as, for example, by recesses, which can either be a blind recess as 161 in FIGURE 28 which does not penetrate completely the wall of the casing member, or which recess can actually extend through said casing or actuating member to thereby take the place of a slot. Or, flexibility can be obtained simply by a particularly narrow wall thickness, or for example in the casing member proximate said latch element as 170 in FIGURES 29 and 30. In any case, the plastic should be sufficiently resilient to permit the required flexing and then return to its original shape. The aforesaid casing member can be the entire one-piece pen barrel as barrel 1 of FIGURES 1 to 5, or it can be an internal switching member, e.g. element 120 in FIGURE 22. In any event, the present invention permits a low cost construction, in some cases permitting as few as four parts to be assembled as in the embodiment of FIGURES 1 to 5. Also, as illustrated by the drawings, a wide number of retraction mechanisms can be used. Furthermore, the present invention provides quick and easy assembly with little labor cost. The invention is also applicable to both pushbutton actuated and tip-actuated writing instruments.

I claim:
1. A retractable ballpoint pen comprising a one-piece slightly resilient molded plastic casing having upper and lower ends and interiorly defining a series of ratchet teeth defining between themselves alternatively deep and shallow longitudinally extending recesses, said casing defining at least one slot extending through said casing downwardly from the upper end of said casing to a point below said ratchet teeth to thereby divide said casing into two portions which can be sprung away from each other; a pushbutton retraction mechanism including a pawl hav- ing teeth alternatingly engageable within said deep and shallow recesses to respectively define the projected and retracted positions of said pen, and a pushbutton extending through said upper end longitudinally moving said pawl whereby said pawl is directed back and forth between said retracted and projected positions by depression and release of said pushbutton; a ballpoint writing unit; and a retraction spring urging said writing unit upwardly into contact with said pawl; said pawl being insertable into said casing through said upper end upon the outward springing apart of said portions.

2. A writing instrument comprising a barrel, a writing unit longitudinally movable within said barrel between projected and retracted positions, a retraction spring disposed between said barrel and said writing unit urging said writing unit towards a retracted position, a pushbutton extending through the upper open end of said barrel, said pushbutton defining a radially projecting latch, the upper part of said barrel having a pair of slots longitudinally extending downwardly from the upper end of said barrel which define barrel portions, a heart-shaped cam groove defined interiorly by said barrel between said slots, said barrel being made of resilient plastic material whereby a barrel portion can be sprung outwardly to permit the insertion of said pushbutton and latch into said barrel until said latch seats in said groove whereupon said sprung barrel portion can be released to spring back to its normal shape whereby said latch is held within said groove.

3. A tip-actuated retraction pen comprising a barrel having an open lower end divided by a pair of slots extending longitudinally upwardly from the lower end of said barrel to thereby define two barrel portions, a ballpoint cartridge unit, a hood unit defining a radially projecting latch, said hood unit being concentric with said cartridge and said barrel, a first coil compression spring disposed between said hood and said cartridge urging said hood outwardly towards an extended position and urging said cartridge upwardly, a relatively strong coil compression spring disposed between said barrel and said cartridge urging said cartridge downwardly against the pressure of said first spring, at least one of said barrel portions defining a heart-shaped cam groove, said barrel portions being spreadable apart from each other upon forcing said tubular hood into the lower end of said barrel until said projecting latch seats within said heart-shaped groove, whereby upon release of said barrel portions, said latch is held within said groove.

4. A retractable ballpoint pen comprising a one-piece molded barrel having lower and upper ends and interiorly having a series of ratchet teeth defining between themselves alternatingly deep and shallow longitudinally extending recesses, said barrel defining two slots, each extending between and through a recess from the upper end of said barrel to a point below said ratchet teeth to thereby form divided barrel portions which can be sprung away from each other, a pawl having teeth alternatingly engageable within said deep and shallow recesses to respectively define the projected and retracted positions of said pen, and an actuating member in the form of a pushbutton having actuating teeth extendable into said recesses, and engageable with the teeth of said pawl whereby said pawl is directed back and forth between said retracted and projected positions by depression and release of said pushbutton, a ballpoint writing unit, and a retraction spring urging said writing unit upwardly into contact with said pawl.

5. A ballpoint writing instrument comprising a casing, a ballpoint cartridge unit longitudinally movable within said casing between projected and retracted positions, a retraction spring urging said cartridge unit to a retracted position, an actuating unit including a pushbutton extending through the upper end of said casing, a torsion rod, and a pawl member, said pawl member being fixed to said pushbutton by said torsion rod wherein said pawl member can be rotated relative to said pushbutton while storing torsional energy in said torsion rod, and a latch receiver comprising a series of actuating teeth defined within said pen barrel by helically extending grooves of alternatingly deep and shallow depths, the upper end of said casing being divided by a pair of diametrically-opposed slots extending through said actuating teeth and downwardly from the upper ends of said casing to a point below said actuating teeth, whereby said pen can be assembled by springing said divided barrel halves away from each other while forcing said actuating unit into said barrel until said pawl snaps into one of said grooves whereby said barrel portions can spring back to their normal form thereby enclosing said pawl within said grooves.

6. A writing instrument comprising a tubular barrel defining a bore and having a latch extending into said bore, said barrel and latch being a single molded piece, a writing unit longitudinally movable within said barrel between projected and retracted positions, a retraction spring disposed between said barrel and said writing units, urging said writing units towards a retracted position, a cylindrical pushbutton extending through the upper open end of said barrel into said bore, said pushbutton having its lower end divided by a slot to define two pushbutton portions, one of said portions defining a heart-shaped cam groove, said pushbutton being made of resilient plastic whereby said pushbutton portions can be sprung towards each other to permit the insertion of said portions into said bore until said latch seats in said groove whereupon said portions will spring back to their normal shape whereby said latch is held within said groove.

7. A writing instrument comprising a casing including a lower barrel member, and upper barrel member in threaded engagement with said lower barrel member, a writing unit longitudinally movable within said casing between projected and retracted positions, a retraction spring disposed between said casing and said writing unit urging said writing unit towards a retracted position, said upper barrel member defining a radially projecting latch, said upper barrel member defining a slot proximate said latch, a pushbutton extending through said upper barrel member and defining a heart-shaped cam groove, said upper barrel member being made of resilient plastic material whereby when uninhibited during assembly said latch can be sprung outwardly from the bore of said upper barrel member to permit the insertion of said pushbutton into said bore until said latch seats in said groove whereupon said latch will spring back to its normal shape, and a rigid cap over said upper barrel member to inhibit said latch whereby said latch is locked against being sprung outwardly to thereby lock said latch within said groove.

References Cited

UNITED STATES PATENTS

| | | | |
|---|---|---|---|
| 683,763 | 10/1901 | Holland | 120—42.03 X |
| 832,981 | 10/1906 | Kennedy | 120—42.03 |
| 1,344,897 | 6/1920 | Johnson | 120—42.03 X |
| 2,560,832 | 7/1951 | Votruba | 120—42.13 X |
| 2,671,354 | 3/1954 | Goos | 120—42.03 |
| 2,881,735 | 4/1959 | Craig | 120—42.03 |
| 3,037,483 | 6/1962 | Caviglione | 120—42.03 |
| 3,060,509 | 10/1962 | McCubbins | 18—42 |
| 3,147,740 | 9/1964 | Bross | 120—42.03 |
| 3,165,788 | 1/1965 | Davidson | 18—42 |
| 3,179,087 | 4/1965 | Kahn | 120—42.03 |
| 3,196,838 | 7/1965 | Weisser | 120—42.03 |

FOREIGN PATENTS

| | | |
|---|---|---|
| 1,311,003 | 10/1962 | France. |
| 641,595 | 8/1950 | Great Britain. |

LAWRENCE CHARLES, *Primary Examiner.*

EUGENE R. CAPOZIO, HERBERT F. ROSS,
*Examiners.*